(12) United States Patent
Sauvageau (10) Patent No.: US 7,689,918 B2
(45) Date of Patent: Mar. 30, 2010

(54) GRAPHICAL INDICATOR FOR THE MULTIPLEXED DISPLAY OF LINE GRAPH INFORMATION

(75) Inventor: Yvon Sauvageau, Mountain View, CA (US)

(73) Assignee: Cisco Technology, Inc., San Jose, CA (US)

(*) Notice: Subject to any disclaimer, the term of this patent is extended or adjusted under 35 U.S.C. 154(b) by 451 days.

(21) Appl. No.: 11/185,076

(22) Filed: Jul. 19, 2005

(65) Prior Publication Data

US 2007/0018984 A1 Jan. 25, 2007

(51) Int. Cl.
G06F 15/177 (2006.01)
G09G 5/00 (2006.01)
G06K 6/68 (2006.01)
G06F 15/173 (2006.01)

(52) U.S. Cl. ........ 715/736; 715/733; 715/734; 715/735; 715/738; 715/853; 345/589; 345/617; 382/219; 709/220; 709/223; 709/224

(58) Field of Classification Search ........... 715/734, 715/736; 709/223, 224
See application file for complete search history.

(56) References Cited

U.S. PATENT DOCUMENTS

| | | | | |
|---|---|---|---|---|
| 5,592,598 A * | 1/1997 | Yamrom | ......... | 345/423 |
| 6,900,822 B2 * | 5/2005 | Germain et al. | ......... | 715/736 |
| 7,016,313 B1 * | 3/2006 | Harper | ......... | 370/254 |
| 2003/0180042 A1 * | 9/2003 | Nelles et al. | ......... | 398/27 |
| 2004/0061701 A1 * | 4/2004 | Arquie et al. | ......... | 345/440 |
| 2005/0259596 A1 * | 11/2005 | Sakai | ......... | 370/254 |
| 2006/0048077 A1 * | 3/2006 | Boyles et al. | ......... | 715/853 |
| 2007/0214412 A1 * | 9/2007 | Arquie et al. | ......... | 715/526 |

OTHER PUBLICATIONS

Konstantinos N. Plataniotis, Anastasios N. Venetsanopoulos, A. Lacroix, Color Image Processing and Applications, May 2000, Springer-Verlag New York LLC, p. 194.*
Cisco Systems, "Getting Started with Cisco Network Assistant, Version 3.0," Text Part No. OL-6194-03, Retrieved from the Internet at <http://www.cisco.com/univercd/cc/td/doc/product/rtrmgmt/cna/.v3_0/gsg/cnags_3.pdf>, retrieved on Sep. 26, 2005, 34 pages.
Cooperative Association for Internet Data Analysis (CAIDA), "Mapnet", located on the internet at <http://www.caida.org/tools/visualization/mapnet/Backbones/>, retrieved on Sep. 26, 2005, 4 pages.

* cited by examiner

Primary Examiner—Kieu Vu
Assistant Examiner—Yongjia Pan
(74) Attorney, Agent, or Firm—Hickman Palermo Truong & Becker LLP

(57) ABSTRACT

A method is disclosed for displaying a multiplexed property indicator on a network topology map. A coloration designation specification that specifies property-color designations is obtained. A network topology map that includes devices and links having properties that are specified in the coloration designation specification is displayed. A link or device in the map is wrapped with a multiplexed graphical sleeve that includes a color for each property in the coloration designation specification that the link or device has.

25 Claims, 5 Drawing Sheets
(3 of 5 Drawing Sheet(s) Filed in Color)

GRAPHICAL INDICATOR FOR THE MULTIPLEXED DISPLAY OF LINE GRAPH INFORMATION

FIELD OF THE INVENTION

The present invention generally relates to computer network management. The invention relates more specifically to methods for graphically illustrating states and properties of devices and links on a network topology map.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Applications that allow users to manage devices and device groups in a network through a Graphical User Interface (GUI) are known. Such network management applications typically allow users to configure devices, apply actions to devices and ports, modify Virtual Local Area Network (VLAN) and Quality of Service (QoS) settings, generate inventory and statistics reports, monitor links and devices, etc.

A network management application may provide a "topology map" of a network that graphically illustrates network devices and links between devices. A network topology map generated by a network management application may display various types of standard information on the topology map about the nodes and links in the network. By viewing a network topology map, a user can quickly determine various types of information about a network. For instance, link speed may be represented by a proportional thickness of a link line, the Spanning Tree Protocol (STP) blocked/unblocked state of a link may be represented by displaying the link line in a particular color, and EtherChannel (i.e. parallel links that share loads) lines may have a striped motif on the topology map. A user can view a topology map that includes these types of representations and instantly discern a large amount of information about the network.

Notable aspects of a link or device may also be tagged with icons in a topology map. For instance, trunk links and optical fiber links may be tagged with special icons. However, icons used to display information on the map do not always instantly and intuitively portray information to a user, like indicators that are more closely integrated into a topology map, such as line colorations, motifs or proportional thicknesses. While integrated indicators such as link line thicknesses are obvious and immediately noticeable, a user must look for the icons on the map, and frequently will not see all icons of a particular type. If many different icons are used to represent various types of information, it becomes even more difficult for a user to find devices or links having a property represented by a particular icon on the topology map. Icons cannot always represent information in a manner that is easily discernable by a user.

Additional information may be presented through popup windows. For example, a user can right-click a device or link icon to obtain more information about that device or link. However, this information is not even on the topology map at all, and a user must manually select a device or link on the map to obtain the information in the popup window.

While graphical indicators integrated into a topology map are very useful for providing information in an intuitive manner, the number of indicators that can be integrated into a topology map is limited. A link line or a network device can only have one color at a time, and therefore the color of the link or device can only indicate one type of information. For example, if the color of the line is used to represent link speed, then the line cannot be colored again to represent some other type of information, such as optical fiber lines, without losing the ability to indicate link speed. While additional information can be represented by displaying a link in a striped motif, again a striped motif can only represent one type of information.

Based on the foregoing, there is a need to display more information about links and devices in a network topology map. Indicators used to represent additional information should be integrated into the map in a generic way, without interfering with indicators already in use. Information should also be displayed in a manner that is easily and instantly recognizable by a user.

BRIEF DESCRIPTION OF THE DRAWINGS

The present invention is illustrated by way of example, and not by way of limitation, in the figures of the accompanying drawings and in which like reference numerals refer to similar elements and in which.

The patent or application file contains at least one drawing executed in color. Copies of this patent or patent application publication with color drawing(s) will be provided by the U.S. Patent & Trademark Office upon request and payment of the necessary fee.

DETAILED DESCRIPTION

A method and apparatus for specifying and displaying multiplexed graphical indicators of network information in a topology map is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Structural and Functional Overview
    2.1 Exemplary Systems
  3.0 Method of Specifying and Displaying a Multiplexed Graphical Indicator on a Topology Map
    3.1 Specifying Coloration Designations
    3.2 Highlighting Secondary Properties on a Topology Map 4.0 Implementation Mechanisms—Hardware Overview
5.0 Extensions and Alternatives

1.0 General Overview

The needs identified in the foregoing Background, and other needs and objects that will become apparent for the following description, are achieved in the present invention, which comprises, in one aspect, a method for displaying a multiplexed property indicator on a network topology map. The method comprises the step of obtaining a coloration designation specification that specifies that a first property is designated a first color, and a second property is designated a second color. A network topology map that includes a graph item that has the first property and the second property is displayed. A wrapper colored according to the coloration designation specification around the graph item is also displayed on the network topology map. In other aspects, the invention encompasses a computer apparatus and a computer-readable medium configured to carry out the foregoing steps.

2.0 Structural and Functional Overview

Known network topology maps are limited in the amount of information that can be graphically represented. Typically, primary or important properties and states, herein termed "primary properties", are represented on all topology maps generated by a network management system using line coloration, line thickness and line motif indicators, as discussed above. These primary properties typically include types of information that all or most users are interested in seeing. For example, link speed may be a primary property that is represented on all topology maps through proportional line thickness.

When a user wants to visualize other properties or states, herein termed "secondary properties", techniques disclosed herein allow a user to specify which secondary properties are to be indicated on the map, and how the various specified secondary properties are to be represented. The terms "primary properties" and "secondary properties" are used herein merely for convenience to indicate different approaches for graphically indicate properties. Any network property can be a secondary property.

The techniques disclosed herein provide for graphically displaying additional information on a network topography map without interfering with the indicators that represent primary properties already in use on the map. Different users may be interested in different secondary properties, and the properties that a user wants to visualize may be unforeseen or may change with time. The techniques disclosed herein allow a network management application to provide users flexibility in how a network topology map is displayed, and what types of secondary properties are indicated on a topology map at any given time. Typically, while all users will see all primary property indicators, each user can customize which secondary properties to display, and how the secondary properties will be represented.

In one embodiment, secondary properties are represented by colors that have a specific meaning as defined by a user's own specification. The representation of a secondary property through a color is termed "highlighting" herein. The meanings associated with a set of colors is termed a "coloration designation."

If a device or link has multiple secondary properties that are of interest to a user, the topology map will highlight each property of interest for the device or link. Significantly, a device or link that has multiple secondary properties of interest is highlighted with a multiplexed indicator that includes a color for each property of interest.

In one embodiment, highlighting is performed by wrapping each device or link that has a secondary property of interest with a thin sleeve that is colored in accordance with the user's coloration designation. In one embodiment, a device or link that simultaneously has multiple secondary properties of interest to a user is highlighted by wrapping a multicolored thin sleeve colored in an alternating fashion in accordance with the coloration designation around the link or device. This multicolored sleeve provides a multiplexed indicator of secondary property information about the device or link.

For example, suppose a user has assigned colors Red, Green and Blue to link properties A, B and C, respectively, in the coloration designation. If a link on the topology map possesses properties A, B and C, then the link will be graphically wrapped in a thin tri-colored sleeve that has the color alteration of Red-Green-Blue-Red-Green-Blue-Red, etc. Because this multi-colored sleeve indicator is spread over the entire length of the link on the displayed topology map, the user is able to easily recognize links having a certain property or combination of properties.

Because the multiplexed graphical indicator for secondary properties is wrapped around a device or link instead of directly integrated into a device or link, the visual representation of secondary property information does not interfere with any of the primary property indicators. For example, a link's speed may still be indicated by the proportional width of the link line, and its STP state represented by the color of the actual link line itself. The multi-colored sleeve that wraps around the link in accordance with the techniques disclosed herein does not interfere with either of these indicators of primary properties. The primary property indicators are still visible, no matter how many secondary properties are represented in the multiplexed secondary property indicator sleeve.

Multiplexed information displayed on a network topology map allows users to easily visualize many different aspects of a network, thereby increasing the user's efficiency when managing a network. Significantly, using these disclosed techniques, a user is provided with multidimensional information that promotes easy network level visualization of path-related information.

Any number of secondary properties can be simultaneously indicated on a topology map using these disclosed techniques, and the techniques can be used to scale to any future unforeseen secondary property highlighting requirements, and allow users to customize the multiplexed secondary property indicator to their own needs.

2.1 Exemplary Systems

Figure 1A:
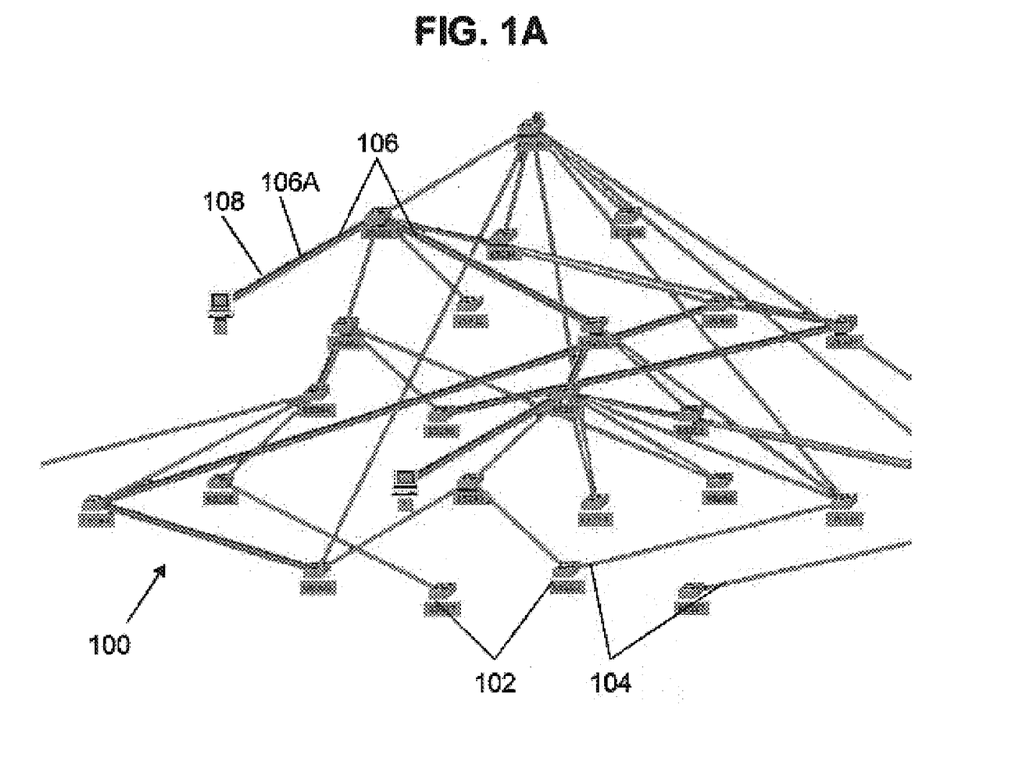
FIG. 1A is an example network topology map with secondary properties highlighted according to one embodiment.

FIG. 1A illustrates an example of a network topology map created using the techniques disclosed herein. Topology map 100 comprises network elements 102 and links 104, 106. In this example, the user has specified a coloration designation scheme in which yellow highlighting is used to indicate half-duplex links. As shown in FIG. 1A, all links 106 highlighted in yellow (i.e., wrapped with a yellow sleeve) are half-duplex links. As a specific example, the link 106A between Node 2 and Node 65282 is wrapped in a yellow sleeve 108 that extends along the entire link. The sleeve 108 indicates that the link 106A between Node 2 and Node 65282 is a half-duplex link.

Figure 1B:
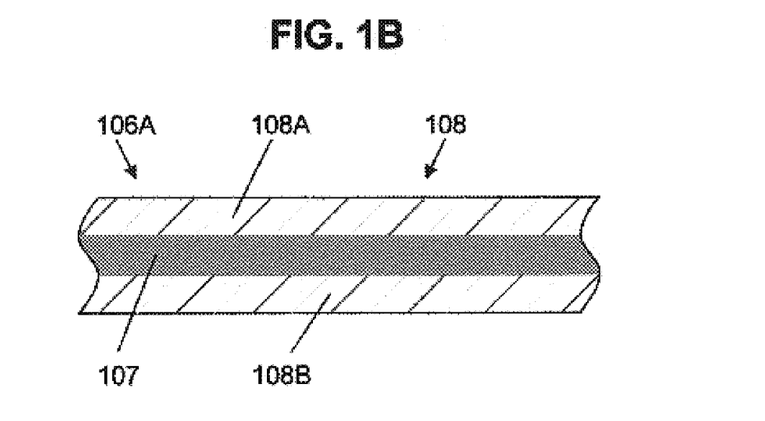
FIG. 1B is a close-up view of a section of a network topology map with secondary properties highlighted according to one embodiment.

As shown in FIG. 1B, in one embodiment, the "sleeve" that "wraps" around a link line 107 is displayed as two colored lines 108A, 108B parallel to the link just above and just below the link line. This appears to a user as a wrapper 108 around the link line 107. Other embodiments are possible.

This example illustrates how the techniques disclosed herein can be used to visualize path-related information. As shown by FIG. 1A, path-related information, such as which paths include only half-duplex links, can be easily visualized, as the yellow-wrapped links 106 stand out immediately. For example, a user can quickly determine that a path from Node 2 to Node 65299 to Node 65281 to Node 1 includes only half-duplex links simply by glancing at the colors of the map of FIG. 1A. If instead icons or labels had been used, it would be much harder to determine which paths include half-duplex links.

Figure 2A:
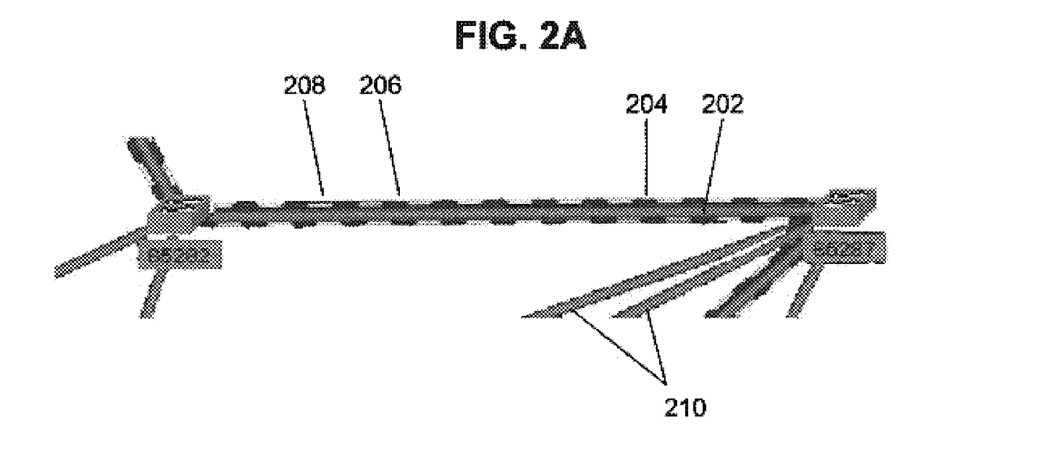
FIGS. 2A and 2B are example network topology maps with secondary properties highlighted according to one embodiment.

FIG. 2A illustrates an example of the same network topology map in which the coloration designation additionally specifies that links that are part of a particular Virtual Local Area Network (VLAN) are to be highlighted in blue. In this particular example, blue has been specified to indicate that a link is part of VLAN 10. In this example, some links on the network topology map may be highlighted only in yellow to indicate that these links are half-duplex links, but are not part of VLAN 10. Some links may be highlighted only in blue to indicate that these links are part of VLAN 10, but are not half-duplex links. Some links may be highlighted by a sleeve containing an alternation of yellow and blue. An example of such a link is shown in FIG. 2A. As shown, the link 202 between node 65282 and node 65287 is wrapped in a sleeve 204 that has blue-yellow alternating colors 206, 208 all along the link line. In this example, the blue-yellow multiplexed sleeve indicates that this link is a half-duplex link that is part of VLAN 10. Other links 210 that are full duplex and not part of VLAN 10 comprise colored lines without a sleeve.

Figure 2B:
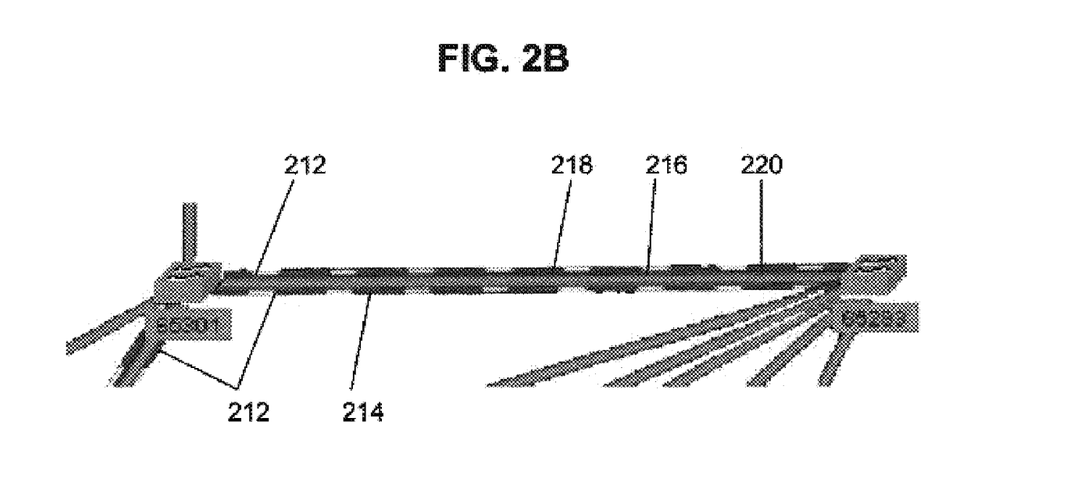

FIG. 2B illustrates another example of the same network topology map in which the coloration designation additionally specifies that links that are overutilized are to be highlighted in magenta. Specifically, in this example, an overutilized link has been defined as a link with a utilization rate of greater than 80%. Other definitions are of course possible. In one display schema, links highlighted only in yellow are half-duplex links, but are not part of VLAN 10 and are not overutilized. Links highlighted only in blue are part of VLAN 10, but are not half duplex links and are not overutilized. Links highlighted only in magenta are overutilized, but are not half duplex links and are not part of VLAN 10. As shown by FIG. 2B, some links 212 may be highlighted by a sleeve 214 that has been colored using an alternation of yellow, blue and magenta as shown by segments 216, 218, 220. As shown in FIG. 2B, a user can easily determine that the link 212A between node 65301 and node 65283 is a half-duplex link in VLAN 10 that is being overutilized.

Although not shown in these figures, the same techniques can be used to highlight devices in the network topology map. For instance, a device (e.g., node 102 in the network topology map 100 if FIG. 1A) may be highlighted by a rectangular "wrapper" comprising a border that is colored or highlighted in a manner consistent with the coloration specification for devices. For example, a user may specify a color for firewall devices, and a rectangular border enclosing a device that is colored according to this coloration designation may be used to indicate that the "wrapped" device acts as a firewall.

In one embodiment, separate coloration designations are used for links and devices. The coloration designations may have different numbers of properties specified, and may or may not use the same colors. All techniques described herein apply to both links and devices. In order to simplify the discussion, the term "graph item" is used herein to refer to either a device or link. More generally, the techniques disclosed herein can be applied to any topology map, not just network topology maps. "Graph item" can therefore refer to any node (e.g. device) or line connecting nodes (e.g., links) in a topology map.

Figure 4:
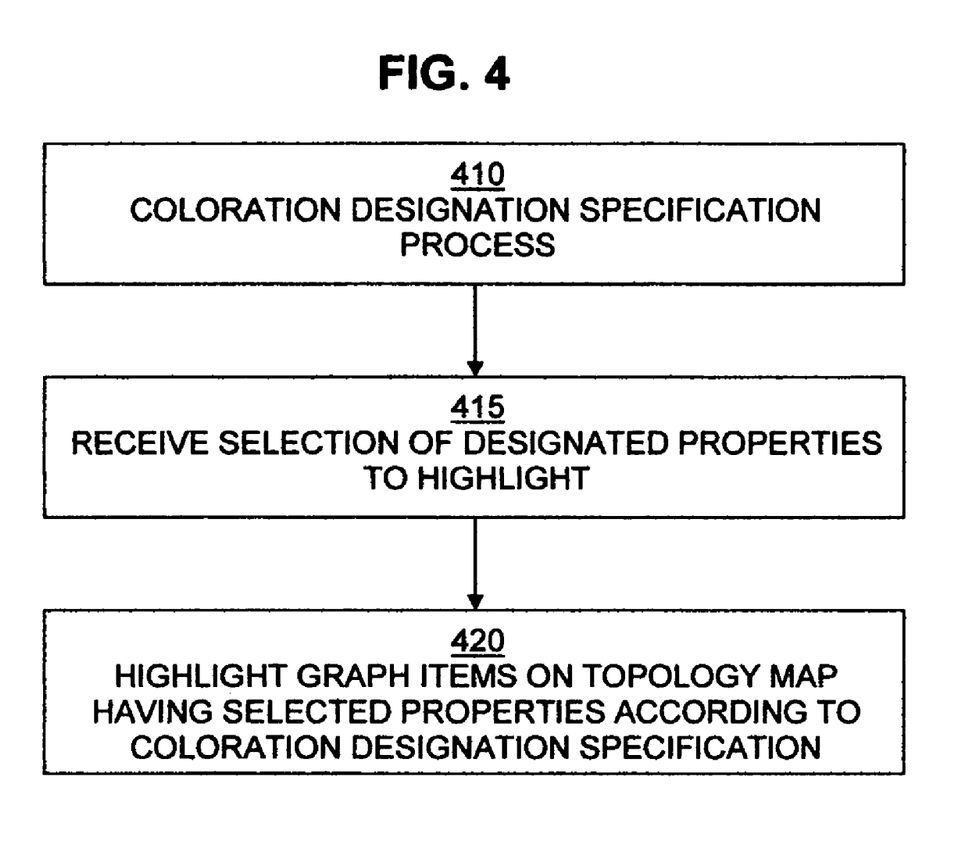
FIG. 4 is a flow diagram that illustrates an overview of one embodiment of a method for specifying and displaying a multiplexed graphical indicator on a topology map.

3.0 Method of Specifying and Displaying a Multiplexed Graphical Indicator on a Topology Map FIG. 4 is a block diagram illustrating one embodiment of a method for displaying a network topology map highlighted according to user-specified coloration designations.

As shown at step 410, coloration designations are specified by a user in a coloration designation specification process. One or more coloration designations may be specified. For instance a user could specify just a coloration designation for links, a coloration designation for devices, or both a coloration designation for links and a coloration designation for devices. The system receives the specification(s) from the user.

3.1 Specifying Coloration Designations

The coloration designation specification process can be initiated by the user selecting on a "topology highlighting" tab or button in a network configuration options window in a network management application, for example. Alternatively, the process could be initiated by the user selecting a "topology highlighting" menu option in a network management application. Many different ways of initiating the coloration designation specification process will be apparent to those skilled in the art.

Figure 3A:
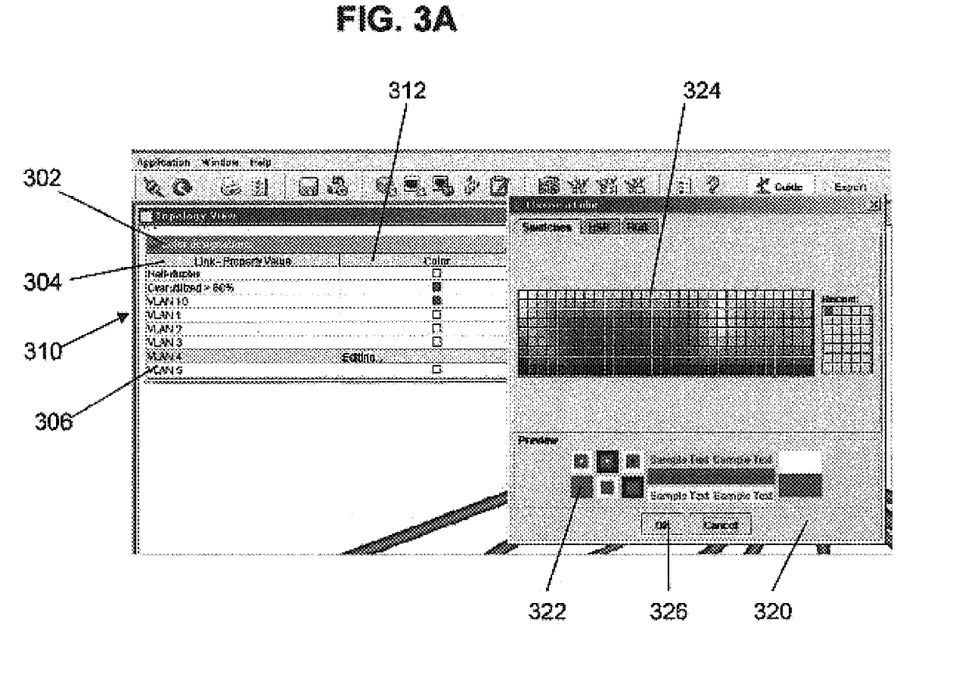
FIGS. 3A and 3B are example user interfaces for entering a coloration designation specification.

In one embodiment, the coloration designation specification process starts by displaying a coloration designation selection window to the user, such as window 310 in FIG. 3A, for example. As shown in "Color Designations" table 302 in window 310, the secondary properties that are available for highlighting ("available properties") are shown in the first column 304. In this example, the available properties are link properties. A similar available properties list could be constructed for devices.

The available properties may be automatically determined through automatic discovery of devices and links in the network. For example, known techniques for discovering members of a cluster or community of devices, and devices that are available to be added to a cluster or community, can be used to discover devices and links in a network. Alternatively, devices and links may be manually added or deleted from any particular network. Each device and/or link in a network may be queried for its properties, and values of those properties, if applicable. For example, each discovered device can be queried for its VLAN associations. The union of results of all the queries can be used as the "master" list of available properties to be used in the "Property Value" column. In addition or alternatively, a user may enter available properties.

The automatic device discovery protocol and device queries can be performed at a predetermined time, and the determined available property list saved. In this embodiment, the same list of available properties is displayed each time the coloration designation process is initiated. Alternatively, the device discovery protocol and device queries can be performed each time a user initiates the coloration designation process. In this embodiment, as new components are added or as components are re-configured, the coloration designation specification process will generate an up-to-date available property list each time the coloration designation specification process is initiated. In yet another embodiment, the available property list, or a portion of the available property list, can be manually set or modified by an administrator at any time.

FIG. 3A illustrates an example user interface that could be used to allow users to specify coloration designations. In the example of FIG. 3A, a user selects a property to designate in window 310, such as "VLAN 4" property 306, and a window 320 that allows a user to select a color to represent the selected property is displayed.

As shown in window 310, half duplex, overutilized and VLAN 10 properties have already been specified as yellow, magenta and blue, respectively, in this example, based on values in "Color" column 312. As shown in window 310, a user has chosen the property "VLAN 4", and is currently editing its coloration designation, as shown by window 320.

As shown in the "Choose a Color" pop-up window 320, a particular red color 322 picked from a spectrum 324 is the current color. Once the user clicks the OK button 326 in window 320, the currently selected color will be specified for VLAN 4 and is shown in color column 312. As will be apparent to those skilled in the art, there are many different interfaces that could be used to receive user color selections, and the particular windows shown in FIG. 3A are not required.

Figure 3B:
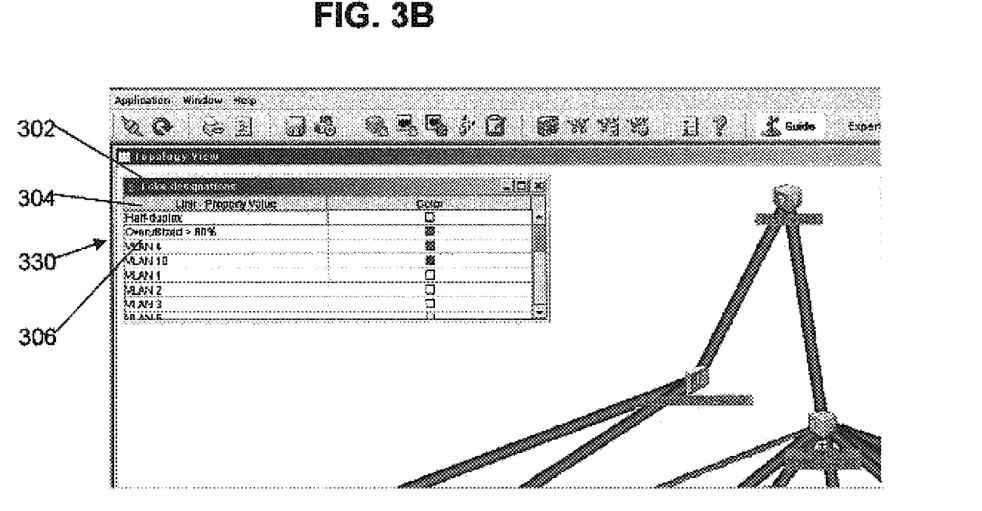

As shown by window 310 in FIG. 3A and window 330 in FIG. 3B, the properties that have already had designated colors specified, herein "designated properties", are shown in the top portion of the available properties list, and properties that have not yet been designated a color, herein "undesignated properties", are shown in the bottom portion of the available properties column 304. As shown, each designated property is listed with a small sample of its designated color. In one embodiment, after a property-color designation is specified and accepted through pop-up window 320, the property that was just specified will automatically move to the top portion of the available properties column 304, and be displayed showing its designated color. This approach is illustrated by comparing window 310 of FIG. 3A with window 330 of FIG. 3B, where VLAN 4 property 306 has been designated as a red color 312A and moved to the top portion of the available properties column 304 with the other designated properties.

The specific implementation shown in FIGS. 3A and 3B is not required, and many different user interfaces could be used to select and display property-color designations, and to indicate which properties are not currently designated to a color. For instance, in an alternative embodiment, VLANs are regrouped into one expandable item within the available properties list. In this embodiment, the first column in the "Color Designations" table will include an expandable tree view of the VLAN property. This allows a user to designate colors at various levels of detail. For instance, a user may be able to designate a color to represent all VLANs, or may designate separate colors for each VLAN. Many variations for allowing granularity in the property-color designation will be apparent to those skilled in the art.

In one embodiment, the property-color designation table shown in window 330 of FIG. 3B is also used to define a legend. The legend can then be displayed on the topology map, or printed out with topology maps. In addition, in one embodiment, the property-color designation table is stored and used by the process that displays the multiplexed graphical indicator, as described below. In this embodiment, each property stored in the property-color designation table preferably has an identifier associated with it.

Although there are almost an unlimited number of colors in a color spectrum, it is possible that a user may designate very similar colors for multiple properties, resulting in nearly indistinguishable highlighting in the topology map. In one embodiment, a warning dialog popup may be used to warn the user of the situation. Determining that two designated colors are too similar may be done in a number of ways. For example, if designated colors can be represented as three-dimensional RGB (Red-Green-Blue) vectors, the difference between two colors can be calculated as the Euclidean norm of the difference between those two vectors. In this example, a configurable threshold value could be set that specifies acceptable vectorial proximity. In this embodiment, when a user selects a color whose vector is "too close" to a color that has already been designated, as determined by Euclidean norms and the configured threshold value, the warning dialog is displayed. In another embodiment the user may be entirely prevented from selecting a "too close" color.

Referring back to FIG. 4, at step 415 a selection of secondary properties to highlight is received. This is an optional step, as in one embodiment, all properties for which a color was designated in step 410 are highlighted. However, in an embodiment which includes step 415, a user can select a subset of designated properties to highlight. In this embodiment, a third column may be added to the "Color Designations" table of window 330 in FIG. 3B. In this column, a user can select which designated properties are to be highlighted in the topology map. For example, the third column may comprise checkboxes, and when a user selects a checkbox for a designated property, that property will be highlighted in the topology map. This embodiment allows users to specify coloration designations once, and keep them effect even if they are not currently selected to be displayed. Users can select and de-select designated properties at any time to change the view of the topology map without re-specifying the entire coloration designation.

3.2 Highlighting Secondary Properties on a Topology Map

At step 420, a multiplexed graphical indicator is displayed on the topology map for each graph item that has at least one selected property. In an embodiment in which optional step 415 is not implemented, all designated properties are highlighted, and "selected properties" are all properties that were designated in step 410 in the coloration designation specification process. Otherwise, "selected properties" includes those properties selected in step 415.

While only one example of a technique for applying a coloration designation specification to a topology is described in detail, there are many ways to apply the coloration designation specification to a topology map, as will be apparent to one skilled in the art.

In an embodiment that uses object-oriented techniques, each graph item (i.e. device or link) on the topology map is an instance of a graph item object class. The graph item object class may include data variables and methods that are used to store a list of properties to be highlighted ("object highlighting properties").

For example, suppose one of the selected properties is that a link is a half-duplex link. An identifier could be assigned to this property, such as "HL." For each object that represents a link in the network that is a half-duplex link, the object highlighting variables could be set to include the "HL" identifier. For example, the following call may be made:

Link.addPropertyToHighlight ("HL")

Then, when the topology map is drawn or refreshed, the half-duplex link designated color as determined by the property-color designation table stored in step 410, is consulted to determine a color for the property identified as "HL." The same process is performed for each selected property.

If a link object's highlighting variables include only the "HL" property identifier, then a sleeve colored according to the color specified for "HL" in the property-color designation table is wrapped around the link object on the topology map. If a link object's highlighting variables include other identifiers, then a sleeve colored in an alternating fashion using the colors designated for each property identifier included in the link object's highlighting variables is wrapped around the link object. Similar techniques can be used for devices.

In one embodiment, a node on a network topology map represent a set of devices, herein termed a "stack", instead of a single network device. A stack typically comprises a group of interconnected devices that works as one. For instance, a group of servers connected by cables may be considered a stack. In this embodiment, a topology map will typically display the stack as a single node that represents the logical device, and links to any particular device within the stack are displayed as links to the stack node on the topology map. Typically, the stack nodes in a topology map are expandable, such that each individual device in the stack is displayed as its own node when the stack is expanded. When expanded, a link to a device in the stack is now displayed as connecting to that particular device. The techniques described herein can be used to highlight devices and links with a multiplexed graphical indicator whether a stack is represented as a logical device or has been expanded to display each device in the stack.

4.0 Implementation Mechanisms—Hardware Overview

Figure 5:
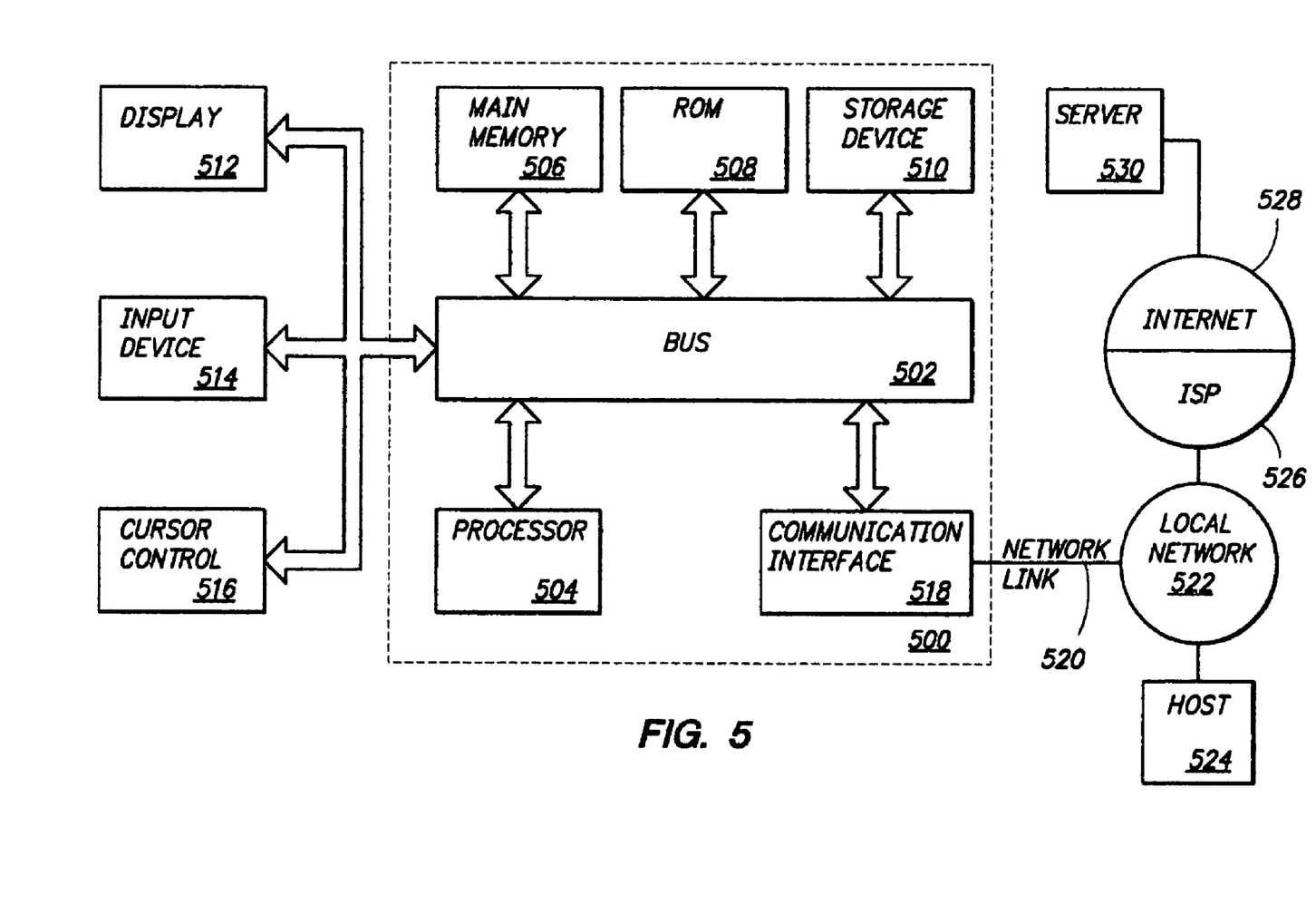
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for displaying a multiplexed property indicator on a network topology map. According to one embodiment of the invention, computer system 500 displays a multiplexed property indicator in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile storage media and volatile storage media. Non-volatile storage media includes, for example, optical or magnetic disks, such as storage device 510. Volatile storage media includes dynamic memory, such as main memory 506.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other storage medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for displaying a multiplexed property indicator on a topology map as described herein.

The received code may be executed by processor 504 as it is received, and/or stored in storage device 510, or other non-volatile storage for later execution. In this manner, computer system 500 may obtain application code.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of displaying a multiplexed property indicator on a network topology map, the method comprising the computer-implemented steps of:

obtaining a coloration designation specification that specifies that a first property is designated a first color, and a second property is designated a second color;

displaying a network topology map that includes a graph item that has the first property and the second property; and displaying a wrapper colored according to the coloration designation specification around the graph item;

wherein the step of displaying a wrapper colored according to the coloration designation specification around the graph item comprises displaying a wrapper that:

is distinct from the graph item and forms a sleeve around the graph item, alternates the first color and the second color, and repeats the first color and the second color at least once;

wherein obtaining a coloration designation specification further comprises determining a first Red-Green-Blue vector for the first color, and determining a second Red-Green-Blue vector for the second color; based on the first Red-Green-Blue vector and the second Red-Green-Blue vector, determining a difference between the first color and the second color; and determining that the difference is greater than a configured threshold value.

2. A method as recited in claim 1, further comprising the step of:

receiving a set of selected properties that includes the first property and does not include the second property;

wherein the step of displaying a wrapper colored according to the coloration designation specification around the graph item further comprises displaying a wrapper colored according to die properties in the set of selected properties in the coloration designation specification.

3. A method as recited in claim 1, wherein the graph item is a network device icon, and the wrapper comprises a rectangular colored border around the network device icon on the network topology map.

4. A method as recited in claim 3, wherein the network device icon is a logical device.

5. A method as recited in claim 1, wherein the graph item is a link line between network devices, and the wrapper comprises two colored lines drawn parallel to the link line on the network topology map.

6. A method as recited in claim 5, wherein the first parallel line is drawn above the link line, and the second parallel line is drawn below the link line.

7. A method as recited in claim 1, wherein the step of obtaining a coloration designation specification comprises obtaining a first coloration designation specification for links and a second coloration designation specification for network devices.

8. A method as recited in claim 1, wherein the step of obtaining a coloration designation specification comprises obtaining a saved coloration designation specification.

9. A method as recited in claim 1, additionally comprising the step of displaying a legend that corresponds to the coloration designation specification.

10. A method as recited in claim 1, wherein the coloration designation specification includes coloration designations for properties that were automatically determined.

11. A computer-readable volatile or non-volatile medium, carrying one or more sequences of instructions for displaying a multiplexed property indicator on a network topology map, which instructions, when executed by one or more processors, cause the one or more processors to carry out the steps of:

obtaining a coloration designation specification that specifies that a first property is designated a first color, and a second property is designated a second color;

displaying a network topology map that includes a graph item that has the first property and the second property; and displaying a wrapper colored according to the coloration designation specification around the graph item;

wherein the step of displaying a wrapper colored according to the coloration designation specification around the graph item comprises displaying a wrapper that:

is distinct from the graph item and forms a sleeve around the graph item, alternates the first color and the second color, and repeats the first color and the second color at least once;

wherein the instructions which when executed cause obtaining a coloration designation specification further comprise instructions which when executed cause determining a first Red-Green-Blue vector for the first color, and determining a second Red-Green-Blue vector for the second color; based on the first Red-Green-Blue vector and the second Red-Green-Blue vector, determining a difference between the first color and the second color; and determining that the difference is greater than a configured threshold value.

12. A computer-readable medium as recited in claim 11, further comprising instructions which, when executed by the one or more processors, cause the one or more processors to carry out the steps of:

receiving a set of selected properties that includes the first property and does not include the second property;

wherein the step of displaying a wrapper colored according to the coloration designation specification around the graph item further comprises displaying a wrapper colored according the properties in the set of selected properties in the coloration designation specification.

13. A computer-readable medium as recited in claim 11, wherein the graph item is a network device icon, and the wrapper comprises a rectangular colored border around the network device icon on the network topology map.

14. A computer-readable medium as recited in claim 13, wherein the network device icon is a logical device.

15. A computer-readable medium as recited in claim 11, wherein the graph item is a link line between network devices, and the wrapper comprises two colored lines drawn parallel to the link line on the network topology map.

16. A computer-readable medium as recited in claim 11, wherein a first parallel line is drawn above the link line, and a second parallel line is drawn below the link line.

17. A computer-readable medium as recited in claim 11, wherein the step of obtaining a coloration designation specification comprises obtaining a first coloration designation specification for links and a second coloration designation specification for network devices.

18. A computer-readable medium as recited in claim 11, wherein the step of obtaining a coloration designation specification comprises obtaining a saved coloration designation specification.

19. A computer-readable medium as recited in claim 11, additionally comprising the step of displaying a legend that corresponds to the coloration designation specification.

20. A computer-readable medium as recited in claim 11, wherein the coloration designation specification includes coloration designations for properties that were automatically determined.

21. An apparatus for displaying a multiplexed property indicator on a network topology map, comprising:
 means for obtaining a coloration designation specification that specifies that a first property is designated a first color, and a second property is designated a second color;
 means for displaying a network topology map that includes a graph item that has the first property and the second property; and
 means for displaying a wrapper colored according to the coloration designation specification around the graph item;
 wherein the means for displaying a wrapper colored according to the coloration designation specification around the graph item comprises means for displaying a wrapper that:
  is distinct from the graph item and forms a sleeve around the graph item,
  alternates the first color and the second color, and repeats the first color and the second color at least once;
 means for determining a first Red-Green-Blue vector for the first color, and determining a second Red-Green-Blue vector for the second color;
 means for based on the first Red-Green-Blue vector and the second Red-Green-Blue vector, determining a difference between the first color and the second color; and
 means for determining that the difference is greater than a threshold value.

22. A graphical indicator on a network topology map wrapped around a graph item having at least two properties that are each designated a respective color in a coloration designation specification, said indicator including a color for each property of the graph item that is designated a color in the coloration designation specification,
 wherein said indicator:
  is distinct from the graph item and forms a sleeve around the graph item,
  alternates at least a first color and a second color, repeats the first color and second color at least once, and
 wherein said network topology map with the graphical indicator is displayed on a computer display;
 wherein a Red-Green-Blue vector is determined for each of the colors designated for the at least two properties, wherein a difference is determined between a first color and a second color based on a first Red-Green-Blue vector and a second Red-Green-Blue vector, and wherein the difference is greater than a configured threshold value.

23. A graphical indicator as recited in claim 22, wherein the graph item is a link, and the indicator comprises a line that extends along the link line in the network topology map.

24. A method as recited in claim 1, further comprising displaying the graph item according to a first representation technique; and displaying the wrapper according to a second representation technique without interfering with the displaying of the graph item.

25. A method of displaying network device properties on a network topology map, the method comprising:
 displaying a network topology map that includes a graphical indicator of a network device that has at least one primary property and a plurality of secondary properties, the graphical indicator representing the at least one primary property according to a first representation technique using at least one of: line coloration, line thickness and line motif indicators;
 obtaining a coloration designation specification that specifies a plurality of colors that designate and correspond to each of the secondary properties, wherein a Red-Green-Blue vector is determined for each of the colors designated for the at least two properties, wherein a difference is determined between a first color and a second color based on a first Red-Green-Blue vector and a second Red-Green-Blue vector, and wherein the difference is greater than a configured threshold value; and
 displaying a multiplexed property indicator, distinct from and forming a sleeve around the graphical indicator of the network device, colored according to a second representation technique that includes each of the plurality of colors and that does not interfere with the graphical indicator of the network device;
 wherein the second representation technique comprises displaying a multiplexed property indicator that alternates each of the plurality of colors and repeats each of the plurality of colors at least once.

\* \* \* \* \*

UNITED STATES PATENT AND TRADEMARK OFFICE
CERTIFICATE OF CORRECTION

PATENT NO. : 7,689,918 B2
APPLICATION NO. : 11/185076
DATED : March 30, 2010
INVENTOR(S) : Yvon Sauvageau Page 1 of 1

It is certified that error appears in the above-identified patent and that said Letters Patent is hereby corrected as shown below:

In the Claims:

Claim 2

Column 11, Line 56, delete "to die properties", insert -- to the properties --.

Claim 21

Column 13, Line 49, delete "threshold value", insert -- configured threshold value --.

Signed and Sealed this

Seventeenth Day of August, 2010

David J. Kappos
*Director of the United States Patent and Trademark Office*